United States Patent [19]

Okamura et al.

[11] Patent Number: 5,189,583
[45] Date of Patent: Feb. 23, 1993

[54] MAGNETIC TAPE CASSETTE HAVING RIBS IN REEL AREAS

[75] Inventors: Masatoshi Okamura; Hiroshi Kaneda, both of Tokyo, Japan

[73] Assignee: TDK Corporation, Tokyo, Japan

[21] Appl. No.: 673,079

[22] Filed: Mar. 21, 1991

[30] Foreign Application Priority Data

Mar. 30, 1990 [JP] Japan .................. 2-35384[U]

[51] Int. Cl.$^5$ ............................................. G11B 23/02
[52] U.S. Cl. ................................................ 360/132
[58] Field of Search ............... 360/132; 242/197–201

[56] References Cited

U.S. PATENT DOCUMENTS 4,678,138  7/1987  Nemoto ................... 360/132
5,089,924  2/1992  Teuber et al. .............. 360/132

FOREIGN PATENT DOCUMENTS 0150987  8/1985  European Pat. Off. ......... 360/132
53-87625  7/1978  Japan .
0202582  10/1985  Japan ................... 360/132

Primary Examiner—A. J. Heinz
Attorney, Agent, or Firm—Oblon, Spivak, McClelland, Maier & Neustadt

[57] ABSTRACT

A magnetic tape cassette comprises a casing formed with upper and lower half casings and reel hubs rotatably supported in the casing to wind and rewind a magnetic tape, wherein at least one of the upper and lower half casings has ribs in the reel areas in the inner sufrface of the base plate so that a number of recesses are formed by the ribs, and wherein the depth of the recesses produced by forming the ribs is varied in correspondence to the degree of roughness of the outer surface of the base plate which is determined by requirements in designing the half casing having the ribs.

3 Claims, 4 Drawing Sheets

MAGNETIC TAPE CASSETTE HAVING RIBS IN REEL AREAS

BACKGROUND OF THE INVENTION

1. Field of the Invention

The present invention relates to a magnetic tape cassette for a cleaning tape cassette usable for video and audio appliances. More particularly, the present invention relates to the construction of half casings for the casing of a magnetic tape cassette or a cleaning tape cassette.

2. Discussion of Background

A conventional magnetic tape cassette usable for, for instance, video appliances comprises a casing formed of a pair of upper and lower half casings and reel hubs rotatably supported in the casing to wind and rewind a magnetic tape, the reel hubs being received in the casing. In order to receive the reel hubs rotatably in the casing, relatively large reel areas are formed at the central portion of the inner surface of the base plate of each of the half casings so that the reel hubs on which the magnetic tape is wound are positioned there. However, when the reel area portions which occupy the major portion of the base plate are formed to have a large wall thickness, a relatively large amount of resin is required, whereby the weight of thus produced casing increases. Further, resin powder is apt to produce due to the mutual friction between the casing and the reel hubs because the reel areas contact with the reel hubs in a surface contact relation.

The inventors of this application have proposed in Japanese Utility Model Application No. 155636/1988 an invention wherein a number of ribs are formed in the reel areas in the inner surface of base plate of the half casings so as to form recesses which reduce substantially the wall thickness of the half casings.

In the half casings having a number of ribs formed in the reel areas of the half casings, however, there was a problem in the outer appearance of the product thus formed, such that there easily caused irregularity in glossiness on the outer surface of the base plates at position corresponding to the ribs formed in the inner surface of the base plates. The above-mentioned problem of the irregularity in glossiness can be more or less improved by forming a coarse surface on the outer surface of the base plates. However, there is a restriction in designing the half casings, and there is also a limitation in determining the roughness of the outer surface of the half casings. Further, in a case that the depth of the recesses formed by forming the ribs is small, an amount of resin used for injection molding the half casing can not be greatly reduced and it is not effective to reduce the weight of the casing.

SUMMARY OF THE INVENTION

It is an object of the present invention to provide a magnetic tape cassette wherein the weight of the casing is reduced by reducing an amount of resin used for forming the same: an amount of resin powder produced due to the contact of reel hubs to the inner wall surface of the casing can be reduced: there is no irregularity in glossiness on the outer surface of the casing and it has an excellent outer appearance, by improving the construction of the half casings which has a number of ribs in the reel areas.

The foregoing and other objects of the present invention have been attained by providing a magnetic tape cassette comprising a casing formed with upper and lower half casings and reel hubs rotatably supported in the casing to wind and rewind a magnetic tape, at least one of the upper and lower half casings having ribs in the reel areas in the inner surface of the base plate so that a number of recesses are formed by the ribs, characterized in that the depth of the recesses produced by forming the ribs is varied in correspondence to the degree of roughness of the outer surface of the base plate which is determined by requirements in designing the half casing having the ribs.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF PREFERRED EMBODIMENT

An embodiment of the magnetic tape cassette of the present invention will be described with reference to the drawings.

Figure 1:
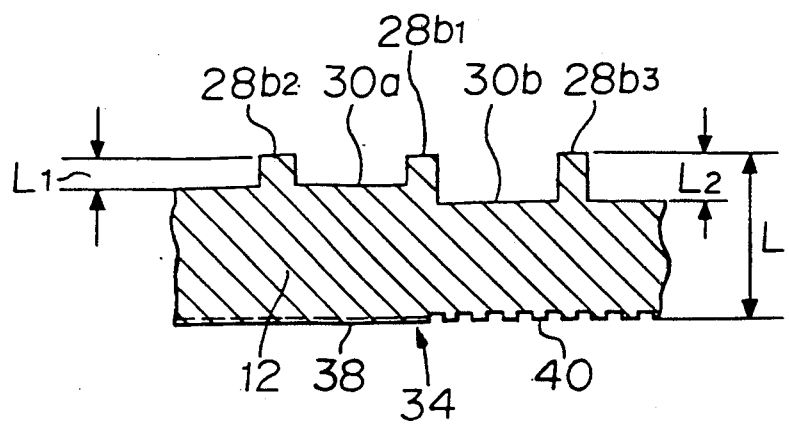
FIG. 1 is an enlarged cross-sectional view partly broken of an embodiment of the lower half casing which constitutes the casing of a VHS type video tape cassette, which corresponds to the cross-sectioned view of FIG. 2.
Figure 2:
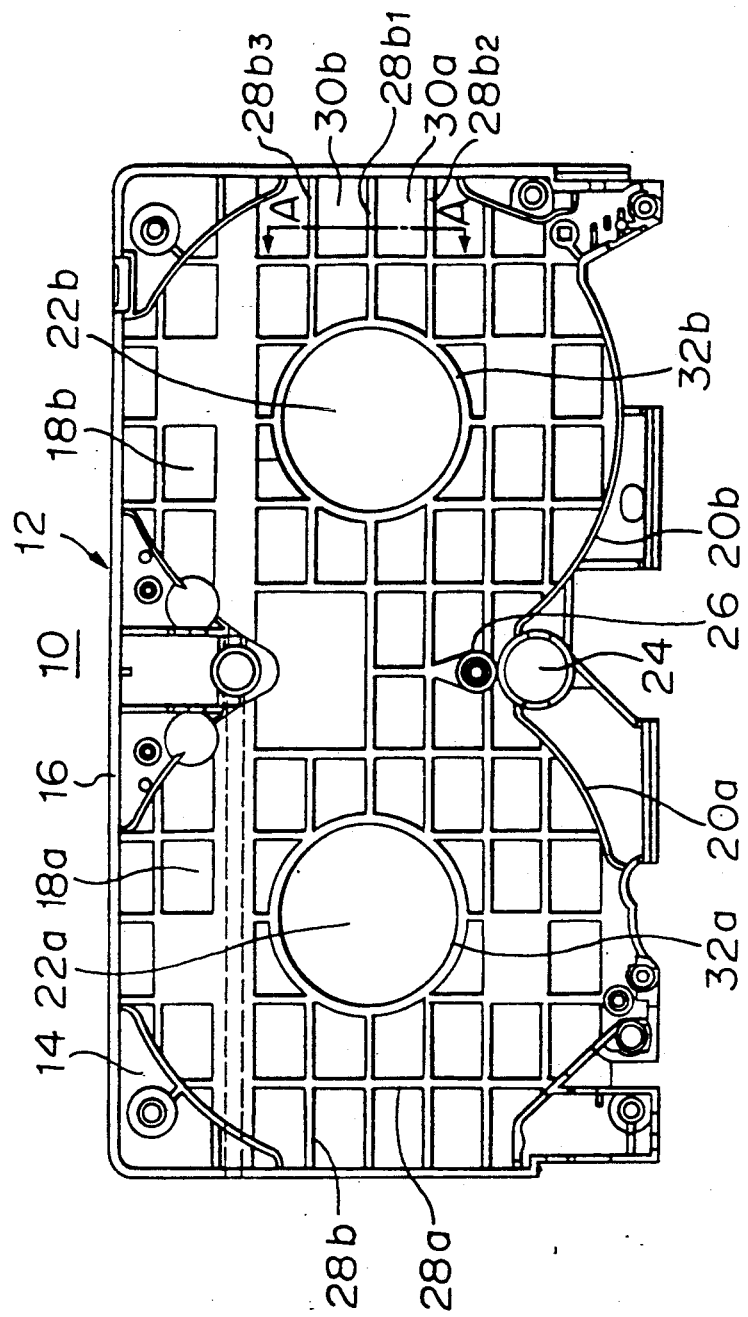
FIG. 2 is a view showing the inner surface of the lower half casing.
Figure 3:
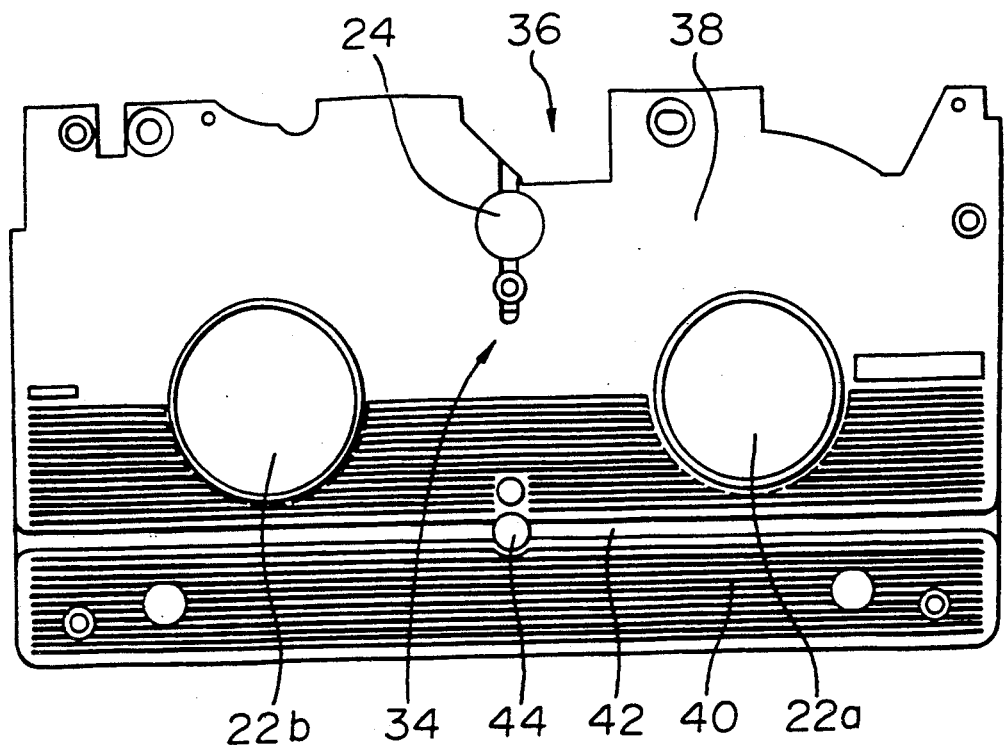
FIG. 3 is a view showing the outer surface of the lower half casing.

FIG. 1 is an enlarged cross-sectional view partly broken of the lower half casing which constitutes the casing of a VHS type video type cassette (the cross-sectional view corresponds to the part taken along a line A—A in FIG. 2); FIG. 2 is a plane view showing the inner surface of the lower half casing, and FIG. 3 is a plane view showing the outer surface of the lower half casing. In FIGS. 1 to 3, a reference numeral 10 designates a lower half casing made of a resinous material and a numeral 12 designates the base plate portion having a rectangular shape of the lower half casing 10. An outer circumferential wall 16 is formed at four side portions of the base plate 12 so as to surround the inner surface 14 of the base plate 12 and to project in perpendicular to the inner surface 14. A number of and various kinds of ribs are arranged at the inner surface 14 so as to project in perpendicular to it. Reel areas 18 (18a, 18b) are formed extending to right and left sides from the central portion of the inner surface 14 of the base plate where a reel hub for winding a magnetic tape and a reel hub for rewinding the magnetic tape are to be positioned. Annular ribs 20 (20a, 20b) are formed to surround the reel areas 18a, 18b. Openings 22 (22a, 22b) through which driving members for driving the reel hubs pass, are formed at each central portion of the right and left side reel areas 18 (18a, 18b). A cylindrical rib 26 is formed near a recessed portion for a light source 24, which is formed at a constricted portion of the front part which faces the magnetic head of a driving unit, of the lower half casing 10. The cylindrical rib 26 is for connecting the lower half casing 10 to an upper half casing 46. Other connecting ribs which are the same as those of a conventional magnetic tape cassette are formed outside the annular ribs 20.

A number of longitudinal and lateral ribs 28 (28a, 28b) are formed at the reel areas 18 so as to cross each other at about 90°, whereby a latticelike arrangement of ribs is obtainable. By arranging the longitudinal and lateral ribs in a lattice form, recesses 30 are formed. Each circular edge rib 32 (32a, 32b) is formed at each of the openings 22 (22a, 22b) for driving the reel hubs so as to extend to the same level as the height of the ribs 28a, 28b which form lattices. The crossing angle of the longitudinal ribs and the lateral ribs is not necessarily at 90° but a desired angle may be selected.

Thus, by arranging the longitudinal and lateral ribs 28a, 28b in a lattice form in the reel areas 18a, 18b to thereby form a number of the recesses 30, the portions of the base plate 28 which correspond to the bottom portion of the recesses 30 have a reduced wall thickness. Accordingly, an amount of a resinous material used for forming the base plate can be small, and the weight of the lower half casing can be reduced. Further, the ribs arranged in a lattice form are integrally connected to the body portion of the base plate 12 which has a reduced thickness, whereby the rigidity of the base plate 12 is not deteriorated and the flexibility is improved.

The outer surface 34 of the base plate of the lower half casing 10 is made coarse so that irregularity in glossiness on the outer surface is inconspicuous. For instance, a portion locating at a tape loading opening 36 which is a side from the central portion of the base plate is entirely subjected to satin-like emboss finishing, and the other portion is entirely subjected to linear emboss finishing to form a linear embosses 40. In FIG. 3, the indication of the satin-like embossed portion 38 is omitted.

The degree of roughness of the outer surface is so determined as to have 2.5±0.3 μm in terms of the center line average roughness Ra, or 17.5±2 μm in terms of the plus point average roughness Rz in consideration of a design image of the final product.

The depth of the recesses 30 which are produced by forming the ribs 28a, 28b arranged in a lattice form is varied so as to correspond to the degree of roughness of the outer surface 34 of the base plate which has to be based on requirements in designing the final product. Specifically, shallow recesses 30a are formed in the inner surface 14 of the base plate so as to correspond to the outer surface where the satin-like embossing portion 38 is formed as shown in FIG. 1, and the depth L1 of the recesses 30a is as large as 25 percents of the wall thickness L of the base plate 12. On the other hand, the depth of the recesses 30b which correspond to the portion of the outer surface where the linear embosses 40 are formed is larger than the depth of the recesses 30a. The depth L 2 of the recesses 30b is as large as 35 percent of the wall thickness L of the base plate. For instance, when the wall thickness L of the base plate 12 is 2 mm, the depth L1 of the recesses 30a which correspond to the portion of the outer surface where the satin-like emboss surface 38 is formed is 0.5 mm, and the depth L2 of the recesses 30b which correspond to the portion where the linear embosses 40 are formed is 0.7 mm. In FIG. 3, a reference numeral 42 designates a groove for fitting a tape deck which is formed passing through a hub lock operation opening 44.

Table 1 shows data in which glossiness on the surface of lower half casings, as samples, each of which has the base plate of 2 mm thick which is the same as the above-mentioned lower half casing 12. In the Table, the surface roughness and the depth of recesses formed by ribs with respect to each of the lower half casings which have subjected to satin-like emboss finishing and linear emboss finishing are shown.

TABLE 1

| | Roughness (μm) | | Depth of recesses (mm) | | |
|---|---|---|---|---|---|
| | Ra | Rz | 0.3 | 0.5 | 0.7 |
| Satin-like embosses | 1.6 ± 0.3 | 10 ± 2 | ◯ | △ | X |
| | 2.5 ± 0.3 | 17.5 ± 2 | ◯ | ◯ | X |
| Linear embosses | 1.6 ± 0.3 | 10 ± 2 | ◯ | ◯ | ◯ |
| | 2.5 ± 0.3 | 17.5 ± 2 | ◯ | ◯ | ◯ |

◯: no irregularity of glossiness.
X: irregularity of glossiness always takes place.
△: irregularity of glossiness sometimes takes place.

As is clear from the Table, when the depth of the recesses formed by the ribs is varied so as to correspond to the degree of roughness of the outer surface of the base plate of the lower half casing, no irregularity of glossiness results on the outer surface and the weight of the lower half casing can be reduced while a suitable degree of roughness can be applied to the outer surface so as to meet a design image for the final product. In this case, the degree of surface roughness in the outer surface of the base plate is preferably 2.5±0.3 μm in terms of the center line average roughness, or 17.5±2 μm in terms of the plus point average roughness wherein the depth of the recesses formed by the longitudinal and lateral ribs is at least 25 percents of the wall thickness L of the base plate 12 of the lower half casing. Especially, when the satin-like embossing portion 38 is formed in the outer surface 34 of the base plate 12 of the lower half casing 10, wherein the satin-like embossing portion 38 has the above-mentioned degree of surface roughness, it is preferable that the depth L1 of the recesses 30a formed by the ribs 28 arranged in a lattice form is 25 percents of the wall thickness L of the base plate 12. Further, when the linear embosses 40 are formed, it is preferable that the depth L2 of the recesses 30b is at least 35 percents of the wall thickness L of the base plate 12.

Figure 4:
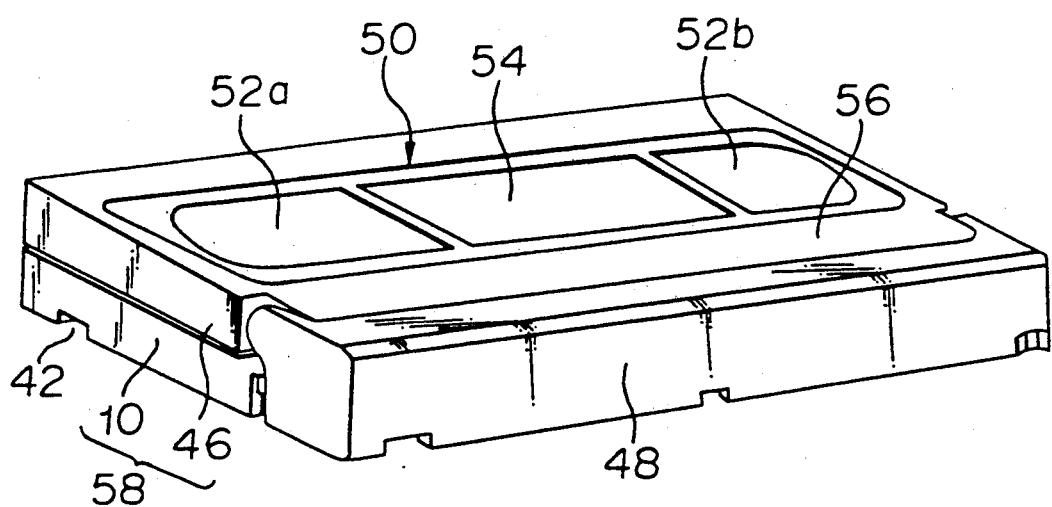
FIG. 4 is a perspective view showing the outer appearance of the video tape cassette of the present invention.
Figure 5:
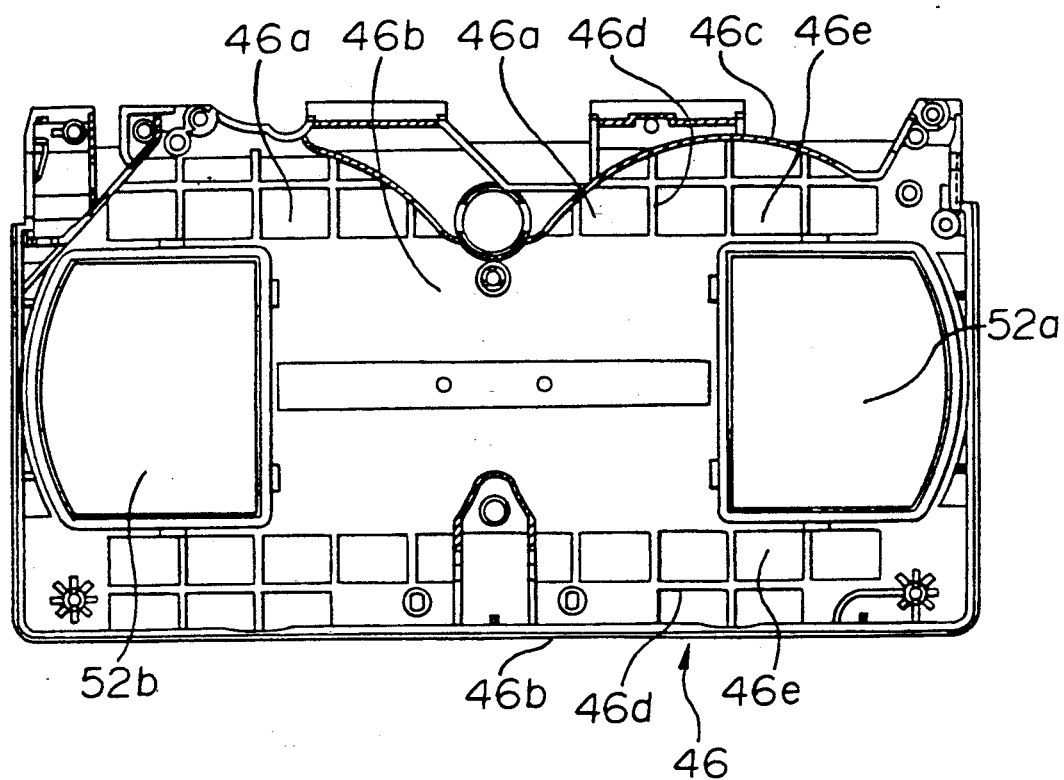
FIG. 5 is a plane view of an upper half casing to be coupled with the lower half casing to form the video tape cassette.

FIG. 4 is a perspective view showing the outer appearance of a VHS type video cassette in which the above-mentioned half casing 12 is used and FIG. 5 is a plane view showing the inner surface of the upper half casing of the cassette.

In FIGS. 4 and 5, a reference numeral 46 designates the upper half casing which is coupled with the lower half casing 12 and a numeral 48 designates a guard panel. The upper half casing 46 is provided with reel areas 46a at the central portion of the inner surface of base plate 46b. An annular rib 46c surrounds around the each of the reel areas 46a in which ribs 46d are formed in a lattice form whereby a number of recesses 46e are formed. In the upper half casing 46, there is no lattice-like ribs at a wide rectangular central portion 46f which is between magnetic tape quantity observing windows 52a, 52b which are respectively outside the reel areas, but springs are arranged at these portions so as to push the reel hubs, and the outer surface area corresponding to the wide rectangular central portion 46f is used for a label area. Further, in the upper half casing 46, the major portion 56 except small areas around the tape quantity observing windows 52a, 52b and the label area 54 which are formed at the central portion of the outer surface 50 of the base plate, is formed to have a coarse surface, and a satin-like embossing surface and/or a linear embossing surface is desirably formed in the major portion of the base plate. A magnetic tape wound on the supplying and winding side reel hubs is received in the casing 58 which is formed by combining the upper and lower half casings 46, 10. The guard panel 48 covers the tape loading opening 36.

When the magnetic tape cassette thus formed is fitted onto a deck so that each of the hubs is driven, the tape reels come to contact with the inner surfaces 14 of the upper and lower half casings 46, 10 and other elements. In this case, the contact between or among them is a line contact because the lattice-like ribs 28 are formed at the reel areas 18. Accordingly, the contacting surface area is small and therefore, an amount of powder resulted from the mutual friction is also small.

The above-mentioned lattice like ribs may be formed at at least the reel areas of either or the both of the upper and lower casings so that a number of recesses are formed at the reel areas.

The present invention can be applied to an audio tape cassette, a cleaning tape cassette or another tape cassette as well as the video tape cassette.

Thus, in accordance with the present invention, a required number of ribs are formed in the reel areas of at least one half casing to thereby form a number of recesses. Accordingly, an amount of resin used for forming the half casings can be reduced to thereby reduce the weight of the molded product. Further, an amount of powder produced due to the mutual friction between the reel hubs and the half casing can be reduced to thereby improve reliability on droping-out. Further, the depth of the recesses is varied so as to correspond to the degree of roughness of the outer surface which is based on requirements in designing the molded product, whereby the occurence of irregularities in the glossiness on the surface of the casing can be eliminated and the casing having an excellent appearance and of a light weight is obtainable.

Obviously, numerous modifications and variations of the present invention are possible in light of the above teachings. It is therefore to be understood that within the scope of the appended claims, the invention may be practiced otherwise than as specifically described herein.

What is claimed is:

1. A magnetic tape cassette comprising a casing formed with upper and lower half casings each having a base plate with reel areas and reel hubs rotatably supported in the casing to wind and rewind a magnetic tape, at least one of said upper and lower half casings having ribs in the reel areas in the inner surface of the base plate of said at least one of said upper and lower casings so that a number of recesses are formed by the ribs, wherien the improvement comprises the depth of the recesses produced by forming the ribs in varied in correspondence to the degree of roughness of the outer surface of the base plate which is determined by requirements in designing the half casing having the ribs.

2. The magnetic tape cassette according to claim 1, wherein the degree of roughness of the outer surface of the bas plate is 2.5±0.3 μm in terms of the center line average roughness or 17.5±2 μm in terms of the plus point average roughness, and the depth of the recesses produced by forming the ribs is as large as at least 25 percent of the wall thickness of the base plate of the half casing.

3. The magnetic tape cassette according to claim 2, wherein the depth of the recesses produced by the ribs is at least 25 percent when a satin-like embossing surface is formed in the outer surface of the base plate of the half casing, or the depth is at least 35 percent when a linear embossing portion is formed.

* * * * *